United States Patent [19]
Spradlin

[11] Patent Number: 6,065,728
[45] Date of Patent: May 23, 2000

[54] HOLDER AND MOUNTING ASSEMBLY FOR A BAR CODE SCANNER

[75] Inventor: Michael D. Spradlin, Springfield, Ohio

[73] Assignee: Spradling Welding Co., Springfield, Ohio

[21] Appl. No.: 09/273,740

[22] Filed: Mar. 22, 1999

[51] Int. Cl.⁷ ............................................. A47F 5/00
[52] U.S. Cl. .................. 248/309.1; 248/300; 248/304; 248/311.2; 206/305; 220/476; 220/480
[58] Field of Search ............................ 248/309.1, 304, 248/316.02, 300, 311.2; 211/70.6, 26; 220/476, 480, 558; 206/305, 320, 576

[56] References Cited

U.S. PATENT DOCUMENTS

| | | | |
|---|---|---|---|
| 2,263,956 | 11/1941 | Russell | 248/311 |
| 2,681,164 | 6/1954 | Kalfen | 248/18 |
| 2,753,054 | 7/1956 | Becher | 211/73 |
| 3,944,809 | 3/1976 | Moore et al. | 240/73 R |
| 4,723,746 | 2/1988 | Gould et al. | 248/205.1 |
| 5,150,813 | 9/1992 | Harris et al. | 220/480 |
| 5,155,346 | 10/1992 | Doing et al. | 235/472 |
| 5,174,539 | 12/1992 | Leonard | 248/558 |
| 5,361,871 | 11/1994 | Gupta et al. | 186/61 |
| 5,588,621 | 12/1996 | Collins, Jr. et al. | 248/27.1 |
| 5,665,955 | 9/1997 | Collins, Jr. et al. | 235/462 |
| 5,806,692 | 9/1998 | Pepper | 211/88.01 |
| 5,971,335 | 10/1999 | Perrin et al. | 248/311.2 |

*Primary Examiner*—Anita M. King
*Assistant Examiner*—Debbie Short
*Attorney, Agent, or Firm*—Francis T. Kremblas, Jr.

[57] ABSTRACT

A holder mounting assembly for a bar code price scanner of the type having a removably mounted rear mounting plate. The holder and mounting assembly includes a vertical rear wall, a horizontal bottom wall provided with a forwardly extending lip portion disposed at an upwardly directed acute angle. Side walls are included which extend along the rear and horizontal walls and the lip portion. The lip portion includes an opening aligned to provide visual access to the reading head of a bar code scanner mounted to the holder assembly. The vertical rear wall includes a plurality of holes disposed to be aligned with holes provided in the scanner mounting plate such that the scanner mounting plate, removed from the scanner, can be fixed to the vertical rear wall of the holder assembly and to a vertical support surface in a convenient location in a retail store area. The bar code scanner may then be conveniently re-mounted to the scanner mounting plate in a conventional manner within the protective confines of the holder. The vertical rear wall is adapted to be mounted to either a square or I-beam type support column of the type typically used in retail store areas.

3 Claims, 6 Drawing Sheets

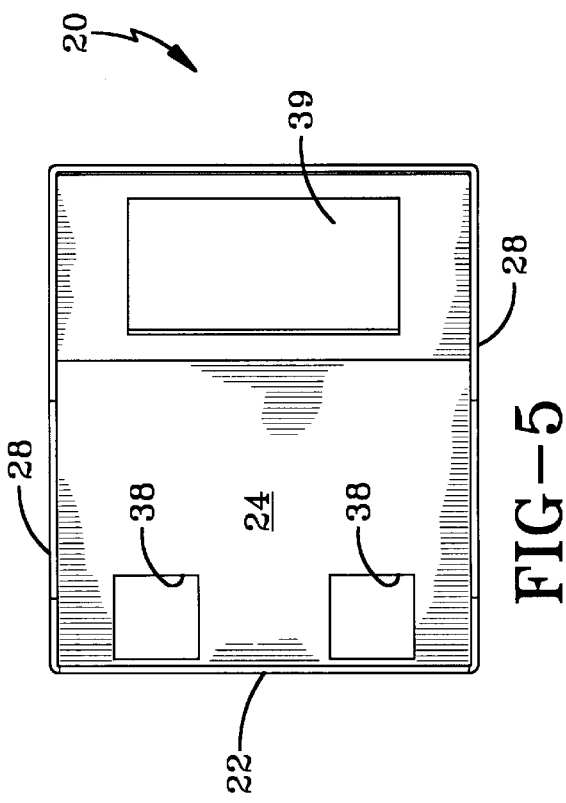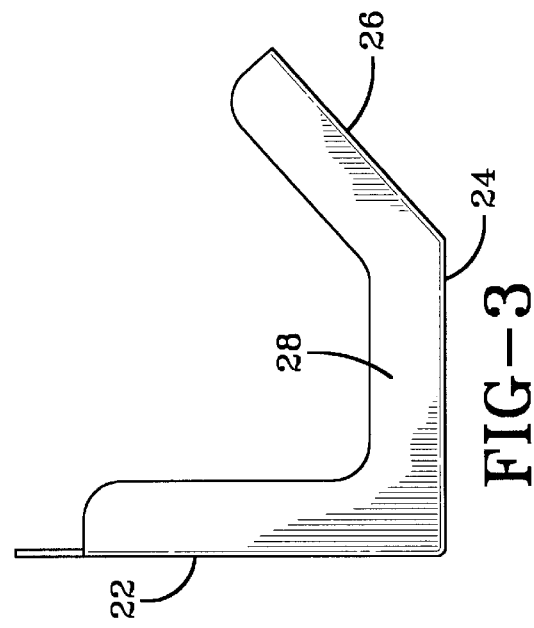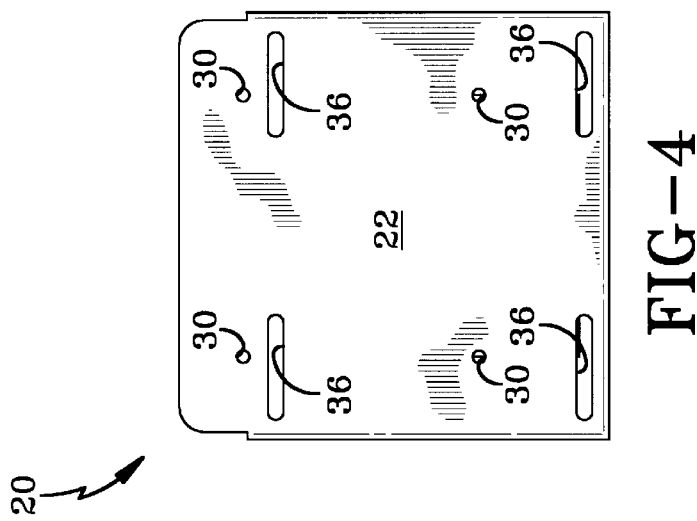

HOLDER AND MOUNTING ASSEMBLY FOR A BAR CODE SCANNER

CROSS-REFERENCE TO RELATED APPLICATIONS (Not Applicable)

STATEMENT REGARDING FEDERALLY SPONSORED RESEARCH OR DEVELOPMENT (Not Applicable)

MICROFICHE APPENDIX (Not Applicable)

FIELD OF INVENTION

The present invention relates generally to holders for bar code scanners and particularly to a holder for a bar code scanner adapted to mount the bar code scanner to a vertical surface in a secure and protected manner.

BACKGROUND OF THE INVENTION

Bar code price scanners have long been used in various retail stores and are particularly popular in large retail stores. Such scanners have been made in a variety of forms including hand held types, horizontally disposed types and types which are mounted on a vertical surface at various locations about the stores, such as vertical columns disposed along product aisle ways.

This latter mentioned type of bar code price scanner is particularly subject to damage because of its exposed location. In particular, the necessary mounting height above the floor for convenient use and the type of prior mounting systems exposed the scanner to inadvertent collisions, such as with the large stocking type carts employed in retail outlets, as well as other causes.

Since bar code scanners of this type present an expensive item, this exposure to damage represents a serious problem which, prior to the present invention, has not been satisfactorily solved by those in this field. Additionally, a solution to this problem includes the requirement that the mounting of any holder must be relatively simple and easy to accomplish as well as not interfere with the convenient use of the scanner in the normal manner.

A typical and commercially popular type of this form of bar code scanner is manufactured by NCR Corporation located in Dayton, Ohio. This scanner includes a rear mounting plate upon which the bar code scanner is conveniently removably fixed. Prior mounting means merely consisted of attaching this backing plate to a wall surface in a condition which exposed the outwardly extending body of the bar code scanner to inadvertent collisions by patrons or by employees performing their usual stocking duties.

Therefore those retail outlets which wished to employ this type of bar code price scanner in several conveniently located areas throughout the store were left the option of exposing the scanners to frequent damage or deciding not to use this type of scanner at all.

BRIEF SUMMARY OF THE INVENTION

The present invention relates particularly to a novel bar code scanner holder and mounting assembly. The holder and mounting assembly comprises a relatively simple, yet versatile holder body which includes a vertical rear wall and a horizontally extending support wall connected to the vertical rear wall. The horizontally extending wall is provided with a forwardly extending lip portion inclined upwardly at an acute angle relative to the horizontal.

The vertical rear wall is provided with a plurality of spaced holes arranged to mate with a plurality of like holes in the rear mounting plate such as provided on the bar code scanner manufactured by the NCR Corporation of Dayton, Ohio. These holes are used to secure the vertical rear wall and the mounting plate together and to the supporting vertical surface. A pair of side walls are provided on the vertical and horizontal walls, including the forward lip portion to create a protective cradle in which the rather delicate bar code scanner apparatus may be securely mounted.

The horizontal support wall includes at least one opening adapted to permit the electrical cord of the bar code scanner to be extended out of the cradle for connection to an electrical outlet. The forward lip portion is provided with a central opening configured to provide unobstructed access to the read head of the scanner for convenient use in the usual manner.

Since various retail outlets are constructed using either square type or I-beam type columns for supporting the roof which are disposed throughout the floor area, such columns represent the usual vertical support surface upon which to mount the bar code scanner in convenient to use locations throughout the store.

Optionally, the vertical rear wall of the holder may also include a plurality of spaced slots adapted to receive threaded fasteners for connection to an I-beam type column in cooperation with conventional C-clamps fixed to the I-beam to add versatility to the mounting choices available in a given retail outlet or to employ additional fasteners for attaching the vertical rear wall to a planar surface of a square column or the like.

BRIEF DESCRIPTION OF THE DRAWINGS

FIG. 3 is a side perspective view of the holder and mounting assembly shown in FIG. 2;

FIG. 4 is a rear elevational view of the holder and mounting assembly shown in FIG. 2;

FIG. 5 is a bottom perspective view of the holder and mounting assembly shown in FIG. 2;

Figure 1:
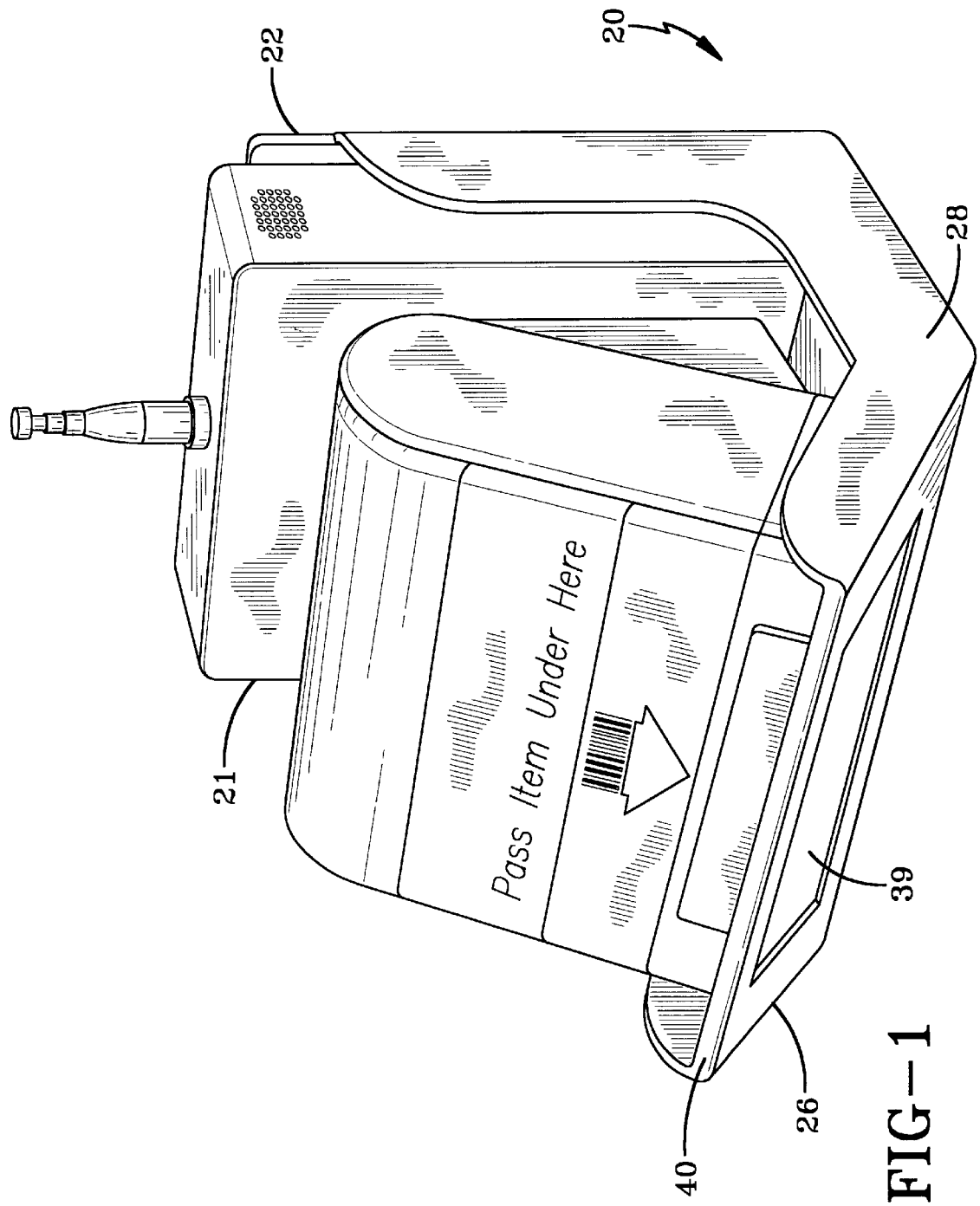
FIG. 1 is a perspective view of a holder and mounting assembly for a bar code scanner constructed in accordance with the present invention.
Figure 2:
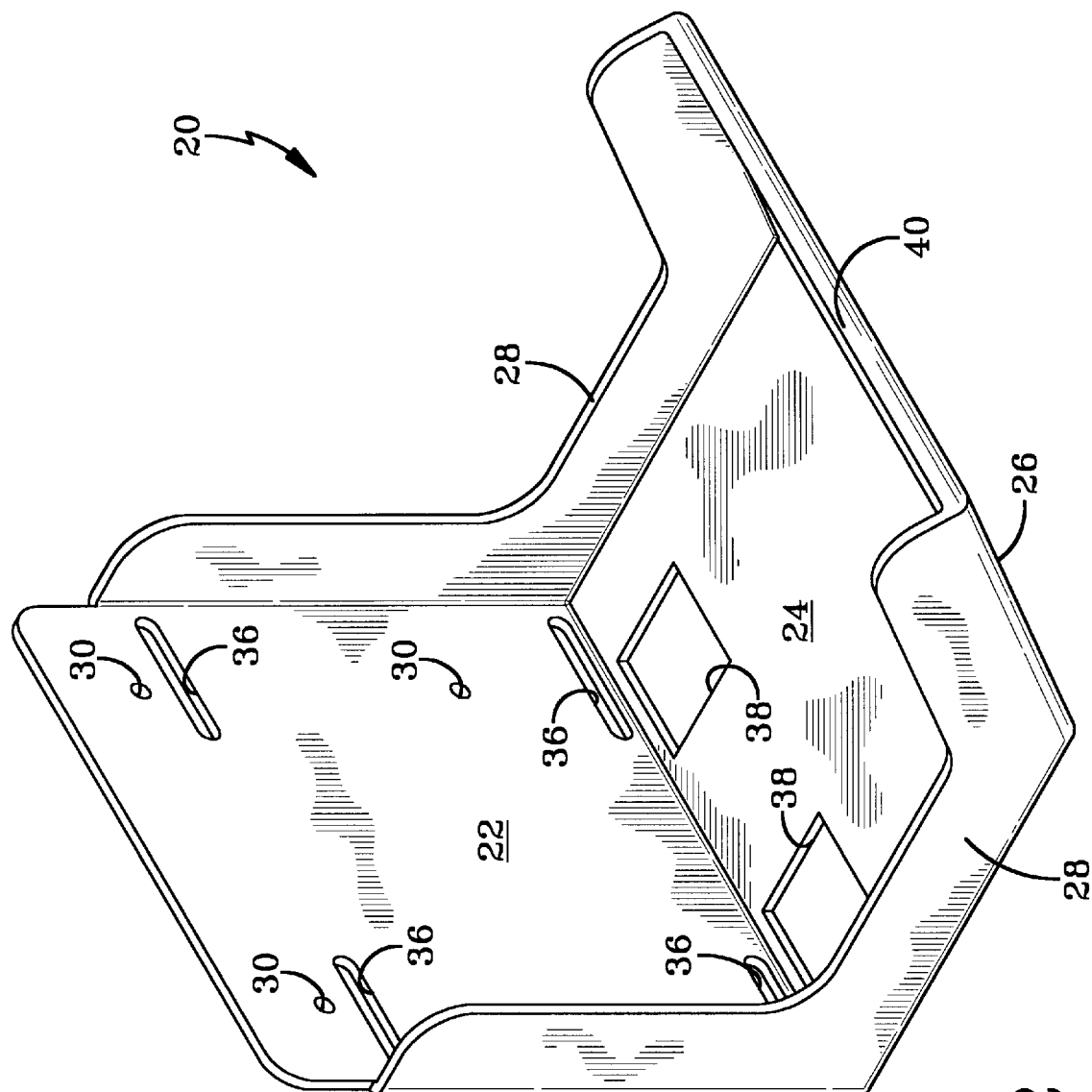
FIG. 2 is a perspective view of the holder and mounting assembly shown in FIG. 1 with the bar code scanner removed from the assembly.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE INVENTION

A protective holder and mounting assembly, indicated generally at 20, constructed in accordance with the present invention to support a bar code scanner 21, is illustrated in FIGS. 1–5 and includes a vertical rear support wall 22, a horizontally extending bottom wall 24, and a forwardly extending lip portion 26. Rear wall 22 may be made from a metal plate welded or otherwise suitably connected to another metal plate which forms bottom wall 24. Preferably forwardly extending lip portion 26 is merely an extension of the same plate bent upwardly at an acute angle from the horizontal selected to match the desired angle of the face of the reading head of a bar code scanner mounted within the assembly 20, however, it could also be a separate plate welded to bottom wall 24.

A pair of side walls 28 are provided and extend generally at a right angle along the outer edges of walls 22, 24 and lip portion 26 to provide a sufficient degree of protection to a bar code scanner mounted within the assembly. Walls 28 are separate plates mounted to the edges of the rear and bottom walls.

Alternatively to using separate plates welded together, the entire assembly may be made from a single metal plate formed into the corresponding structure shown using well-known metal stamping and bending processes.

Rear wall 22 is provided with two pair of spaced holes 30 arranged to matingly align with holes such as 25 provided in the rear mounting plate 23 of a bar code scanner such as one manufactured by NCR Corporation of Dayton, Ohio. In this manner the rear mounting plate 23 of the scanner, which is adapted to be removed from the bar code scanner, can be mounted to rear wall 22 via conventional threaded fasteners, such as Hex bolts, for example, as will be described in detail later herein.

A plurality of spaced horizontally extending slots 36 may also be provided in rear wall 22 at spaced locations to provide versatility in mounting rear wall 22 to either a square or an I-beam type column as described in detail later herein.

Horizontal wall 24 is provided with at least one electrical cord access opening 38. Preferably the other opening 38 is provided for access to a data port located on the bottom of the scanner.

Lip portion 26 includes a large central opening 39 adapted to expose the reading head of the bar code scanner so as to permit one to pass an object carrying a bar code past the reading head in the usual manner.

For safety reasons, it is desirable to bend the forwardly most edge 40 of lip portion 26 upwardly and rearwardly as shown to reduce the sharpness of this edge and the chance of injury to persons accidentally or inadvertently contacting this leading edge.

The mounting of assembly 20 to either a square or I-beam type column and mounting the bar code scanner within the assembly is a relatively easy task.

With respect to a square column presenting a planar surface, one initially places the rear wall 22 in the desired position on the surface of the column. Using a conventional marker extended through each of the four holes 30, one marks the surface. Then a hole is made in the surface of the square column, not shown, at each mark using an appropriate size drill. Each hole is threaded using a screw of appropriate size. If further support appears necessary, additional holes may be made using the slots 36 in the same manner.

Next, the bar code rear mounting plate 23 is removed from the bar code scanner according to the directions of the manufacturer.

Figure 8:
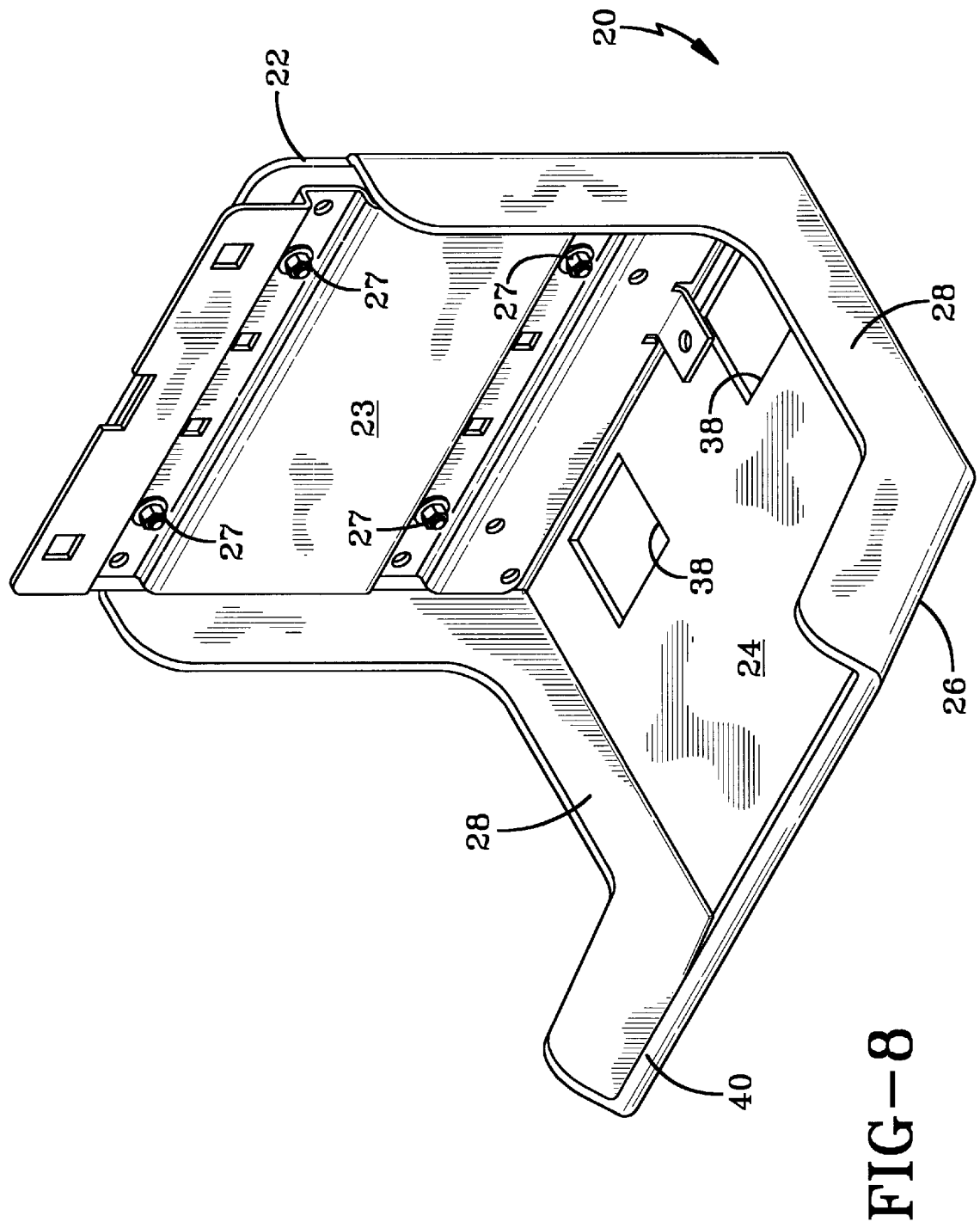
FIG. 8 is a perspective view illustrating the rear mounting plate shown in FIG. 7 attached to the holder and mounting assembly shown in FIG. 2.

As shown in FIG. 8, the rear wall 22 and the rear mounting plate 23 of the scanner are arranged superposed to one another with the holes 30 in the rear wall 22 and the holes 25 in the rear mounting plate 23 aligned with the pre-drilled holes in the vertical surface of the column. Appropriate threaded fasteners such as at 27 are extended through and threaded into the aligned holes. The bar code scanner is then re-mounted on the scanner rear mounting plate in the usual manner following the manufacturer's instructions.

The result is the bar code scanner is quickly and conveniently mounted in its usable position and secured against incidental damage by the holder assembly 20. In the event a stocking cart or the like engages the holder assembly 20, the force of the collision is absorbed by the holder assembly 20 and the bar code scanner is protected from any normal amount of force generally encountered from such collision.

Preferably, the holes 30 are disposed such that the scanner rear mounting plate is received in a position wherein, upon mounting of the scanner onto the rear mounting plate, the scanner is disposed in a spaced relationship from the horizontal wall 24, side walls 28, and lip portion 26 so the scanner is further isolated from collision forces exerted on the holder 20.

Figure 6:
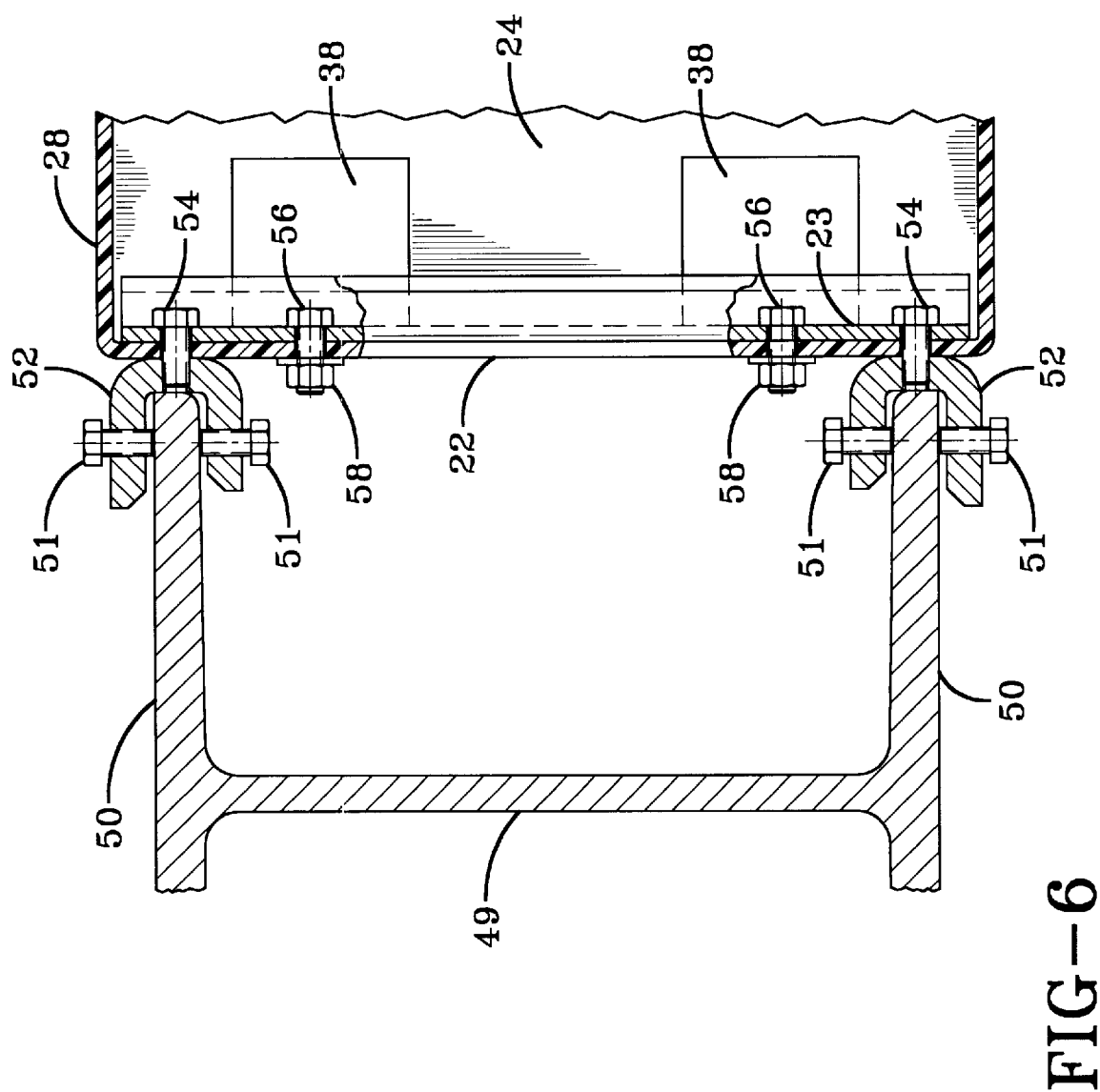
FIG. 6 is a partial top plan view illustrating a convenient arrangement for mounting the holder and mounting assembly shown in the preceding figures. to an I-beam type column.
Figure 7:
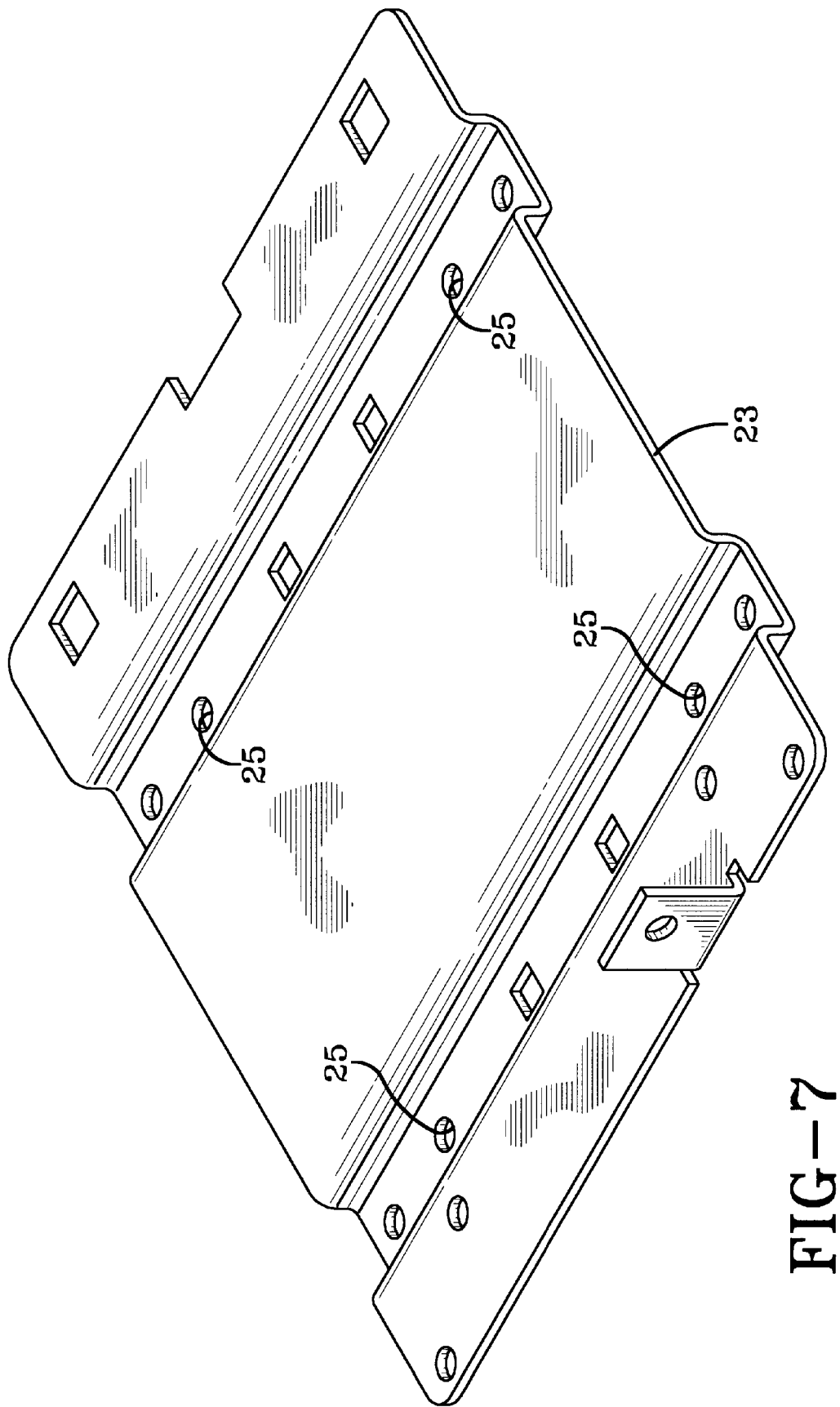
FIG. 7 is a perspective view of a conventional rear mounting plate for a commercially available bar code scanner illustrated apart from the bar code scanner.

In those instances where the holder assembly is to be mounted on an I-beam column 49, one preferably mounts C-type clamps to the outer edges of the flanges 50 of the I-beam column, such as shown in FIG. 6. It is recommended that the C-clamp 52 first be attached to rear wall 22 using threaded fasteners such as 54 disposed through slots 36 and into a threaded hole, not shown, in the face of the C-clamp. Prior to fully tightening the fasteners 54, C-clamps 52 are then securely mounted on the flange 50 of the I-beam in the desired position by tightening set screws 51 and then fasteners 54 are fully tightened. The scanner rear mounting plate 23 is removed in a conventional manner from the bar code scanner and mounted to rear wall 22 as priorly described using holes 30 via fasteners 56 and nuts 58. The bar code scanner is then similarly re-mounted to the rear backing plate as described before herein according to the manufacturer's instructions.

While certain preferred embodiments of the present invention have been disclosed in detail, it is to be understood that various modifications may be adopted without departing from the spirit of the invention or scope of the following claims.

What is claimed is:

1. The combination of a bar code price scanner having a removably mounted rear mounting plate and a holder and mounting assembly mountable to a vertical support surface; said holder and mounting assembly comprising, a) a vertically extending wall provided with two pair of holes arranged to matingly align with two pair of holes provided in said scanner rear mounting plate;

b) a horizontally extending wall connected to the lower portion of said vertically extending wall and provided with at least one opening configured to accept a conventional power supply cord connected to said bar code price scanner;

c) a forwarding extending lip portion provided on said horizontally extending wall and inclined upwardly at an acute angle thereto, said lip portion and provided with a generally centrally located opening configured to provide visual access to a reading head of a bar code scanner operatively supported in said assembly;

d) a pair of spaced side walls, a respective one of said side walls connected to and extending along an outer edge of said vertically extending wall, said horizontally extending wall, and said forwardly extending lip portion in generally surrounding relationship to at least a portion of a bar code scanner operatively mounted in said assembly; and e) a plurality of fasteners, a respective one extending through a respective one of said matingly aligned holes in said vertically extending wall and in said scanner rear mounting plate to fix said plates in superposed relationship to one another and to a vertical support surface.

2. The combination defined in claim 1 wherein said two pair of holes in said vertically extending wall are arranged to support said scanner rear mounting plate in a position to fixedly receive and support said bar code scanner in spaced relationship from said horizontally extending wall and said pair of side walls.

3. The combination defined in claim 1 wherein said vertically extending wall further includes a plurality of spaced, horizontally extending slots, each configured to receive a respective one of a plurality of threaded fasteners for mounting said vertical extending wall to a vertically extending support surface.

* * * * *